United States Patent [19]

Matesa et al.

[11] Patent Number: 4,704,155
[45] Date of Patent: Nov. 3, 1987

[54] HEATING VESSEL LID CONSTRUCTION FOR A GLASS MELTING FURNACE

[75] Inventors: Joseph M. Matesa, Plum Boro; Bert K. Krushinski, Murraysville; Arthur C. Knickerbocker, Pittsburgh, all of Pa.

[73] Assignee: PPG Industries, Inc., Pittsburgh, Pa.

[21] Appl. No.: 873,003

[22] Filed: Jun. 11, 1986

[51] Int. Cl.$^4$ .............................................. C03B 5/44
[52] U.S. Cl. ...................................... 65/347; 65/337; 65/346; 65/356; 432/238
[58] Field of Search .................. 65/337, 346, 347, 356; 432/238

[56] References Cited

U.S. PATENT DOCUMENTS

| 180,028 | 7/1876 | Holley . | |
|---|---|---|---|
| 1,109,553 | 9/1914 | Slick . | |
| 1,724,340 | 8/1929 | Charles . | |
| 2,699,740 | 1/1955 | Weber | 110/99 |
| 2,753,711 | 7/1956 | Weber | 72/55 |
| 3,183,865 | 5/1965 | Ross | 65/346 |
| 4,319,908 | 3/1982 | Sensi | 65/182.5 |
| 4,340,412 | 7/1982 | May | 65/182.5 |
| 4,424,756 | 1/1984 | Merkle | 110/339 |
| 4,434,495 | 2/1984 | Tomizawa | 373/76 |
| 4,475,470 | 10/1984 | Merkle | 110/332 |

FOREIGN PATENT DOCUMENTS

| 544804 | 2/1932 | Fed. Rep. of Germany ...... 432/238 |
| 3427407 | 1/1986 | Fed. Rep. of Germany ...... 432/238 |

Primary Examiner—Arthur Kellogg
Attorney, Agent, or Firm—Andrew C. Siminerio

[57] ABSTRACT

A lid construction for a heating vessel. Discrete insulating members are supported by water cooled pipes above the vessel. The cooling pipes fit into grooves along the vertical side walls of the insulating members. Each member has a support independent from the supports for the other members so that an individual member can be removed within having to remove additional members.

26 Claims, 6 Drawing Figures

HEATING VESSEL LID CONSTRUCTION FOR A GLASS MELTING FURNACE

BACKGROUND OF THE INVENTION

1. Field of the Invention

This invention relates to high temperature heating vessels and in particular to a modular lid construction for a glass melting furnace.

2a. Technical Considerations

One type of glass melting process entails depositing pulverulent batch materials into a pool of molten glass maintained within a tank type melting furnace and applying thermal energy until the materials are melted into the pool of molten glass. The melting tank conventionally contains a relatively large volume of molten glass so as to provide sufficient residence time for currents in the molten glass to effect some degree of homogenization before the glass is discharged to a forming operation. These recirculating flows in a tank type melter may result in inefficient use of thermal energy. Conventional overhead radiant heating is inefficient in that only a portion of its radiant energy is directed downward towards the material being melted.

As an alternative to conventional tank type glass melting furnaces as described above, U.S. Pat. No. 4,381,934 to Kunkle and Matesa discloses an intensified batch liquefaction process in which large volumes of batch are efficiently liquefied in a relatively small liquefaction vessel. This type of process, particularly when using intensified heat sources, produces relatively small volumes of high temperature exhaust gas. The heat from this exhaust gas can be recovered and used to directly heat a batch stream feeding the liquefaction vessel so as to improve the overall efficiency of the process.

In a heating operation, the high temperature may adversely affect the heating vessel. Heating processes may cause portions of the material being heated to vaporize. These vapors may be corrosive and corrode exposed inner surfaces of the vessel. The corrosion may be further accelerated by the high temperature environment within the heating vessel.

In a glass batch melting process as taught in U.S. Pat. No. 4,391,934, the degradation of the exposed surface of the liquefaction vessel's lid is further aggravated by the high temperature exhaust gas from the burner, that circulates through the vessel. Not only may the high temperature exhaust combine with the vaporized batch materials but also with particulate matter within the vessel. The entrained particulates may have an abrasive action, which when combined with the high temperature gas stream corrodes and erodes the lid's inner surfaces.

Due to the high temperature and corrosive effects of the gas stream within the vessel as well as any erosion effects from the entrained particulates, the lid or portions of the lid must be periodically repaired or replaced to correct any excessive wear at its inner surface. It would be advantageous to have a lid design wherein selected portions of the lid can be removed as a single unit with minimal effect on the remaining portion of the lid or the heating process.

2b. Patents of Interest

U.S. Pat. No. 180,028 to Holley teaches an arch furnace roof construction wherein cooling pipes are positioned between adjacent rows of refractory block. Each block is channeled to receive one-half of the pipe cross-section so that the pipe is fitted between adjacent blocks. The pipes can also be used to form tension members to support blocks along a downwardly curved configuration rather than in an arch type arrangement.

U.S. Pat. No. 1,109,553 to Slick teaches furnace construction wherein refractory bricks are carried by hollow, water cooled girders extending up between and separating the upper parts of the rows of bricks. The girders span the width of the furnace and include enlarged shoulder portions that are received by corresponding recesses in the bricks. The bricks supported by adjacent rows of girders can be formed to support additional bricks not directly supported by the girders.

U.S. Pat. No. 1,724,340 to Charles teaches a smelting furnace construction wherein the bricks in an arched roof are water cooled. The bricks are hollow and include a metal cylinder container therein. Coolant is pumped into the cylinder, circulated therethrough and removed. The coolant inlets and outlets of each cylinder are connected to common overhead cold water and hot water headers, respectively.

U.S. Pat. Nos. 2,699,740 to H. W. Webber and 2,753,711 to H. G. O. Webber each teach suspended roof construction wherein a plurality of bricks are interconnected to and supported by a carrier which in turn is supported by an overhead frame. In U.S. Pat. No. 2,699,740 the carrier is a specially shaped wide flange section. The upper flange wraps around the lower flange of an overhead frame and its lower flange supports a pair of bricks that are interconnected with other bricks to form the roof structure. In U.S. Pat. No. 2,753,711 the upper section of a carrier brick is supported by a hanger beam while its flared lower section supports a set of interlocking brick.

U.S. Pat. No. 4,319,908 to Sensi teaches a float glass forming chamber with a roof comprised of suspended refractory slabs. Hanger rods extend through the roof slabs and are affixed at their lower ends to horizontal plates on which the weight of the slab rests. Each rod is affixed at its upper end to an overhead support structure. The number of joints and non-planar interior surfaces are reduced to suppress condensation and drippage of volatile materials within the chamber.

U.S. Pat. No. 4,340,412 to May teaches a float glass forming chamber with an externally supported roof. The roof is comprised of relatively large precast refractory slabs suspended from above by a hanger arrangement external to the forming chamber enclosure. The support arrangement is adapted to engage the top sides of the slabs so as to avoid support members which extend through or nearly through the roof elements.

U.S. Pat. No. 4,434,495 to Tomizawa et al. teaches a cooling pipe structure for arch furnaces. A plurality of cooling pipes are embedded in the refractory and are supported by a pair of support pipes. The support pipes recirculate coolant back and forth between the support pipes through the cooling pipes.

U.S. Pat. Nos. 4,424,756 and 4,475,470 to Merkle teach a suspended roof for an industrial furnace. Each hanger is recessed in the side of a pair of adjacent carrier bricks. Each carrier brick, in turn, supports two filler bricks so that a single embedded hanger supports six bricks: two carrier bricks and four filler bricks. The hangers are hung from telescoping tubes which may be retracted to remove successive groups of bricks. The tubes are hung by rods or wires from an overhead cross beam to support the entire roof structure.

In the previously discussed art, there are no provisions made for removing a single insulating unit and its cooled support structure from a furnace roof without requiring additional blocks to be removed with it or requiring the heating operation of the furnace to be shut down. Each provides in one form or another (a) that the units in the roof are interconnected so that the removal of one unit requires the removal of the adjacent units or (b) that the unit hangers are connected to common supports that require the removal of plurality of hangers prior to reaching as interior block unit or (c) that a plurality of units are all supported by a common hanger and removal of an individual interior unit would require the removal of the units leading to the interior unit or removal of the entire hanger along with all the units.

SUMMARY OF THE INVENTION

An object of the present invention is to provide a lid for a heating vessel having individually removable insulating modules so that a single module can be removed without having to remove the entire lid and with minimal effect on the heating operation. The lid includes a plurality of discrete heat insulating members and cooled supports to support selected members above the heating vessel such that at least one of the members along with its cooled support is independent from the other insulating members and cooled supports. In one embodiment, the insulating members are rectangular solid blocks with a pair of cooled support pipes positioned in grooves located in two of the opposing side walls of each block. In a preferred embodiment of the invention, the support pipes are positioned in the lower portion of the side walls such that the insulating member provide some protection to the pipes from the heat while the majority of the weight of the insulating member is supported above the pipes rather than suspended below the pipes. Inlet and outlet portions of the pipes extend above the upper surface of the block and may be interconnected. A tie rod extending downward from an overhead frame may attach to the interconnecting structure to suspend the insulating member and support pipes below the frame.

The present invention provides a lid arrangement for situations wherein only a portion of a heat insulating lid prematurely fails due to corrosion, erosion, cracking, etc. or where the support structure fails due to rupture of a cooling line, structural failure, etc. The modular lid design provides the flexibility to replace only the insulating member or support that has failed without having to completely stop the heating operation and/or remove large portions of the roof structure simply to replace a smaller portion.

DETAILED DESCRIPTION OF THE INVENTION

This invention is suitable for use in a process wherein a hostile environment requires the replacement of worn areas of a lid for a container. It is particularly well suited for use in a heating process where high temperatures and additional conditions within a heating vessel, such as circulation of corrosive and abrasive materials, may necessitate periodic replacement of selected portions of the lid of the heating vessel. The invention is presented in connection with a glass batch liquefaction process of the type taught in U.S. Pat. No. 4,381,934 but it is understood that the invention can be used in any heat related process in which a lid structure is employed.

Figure 1:
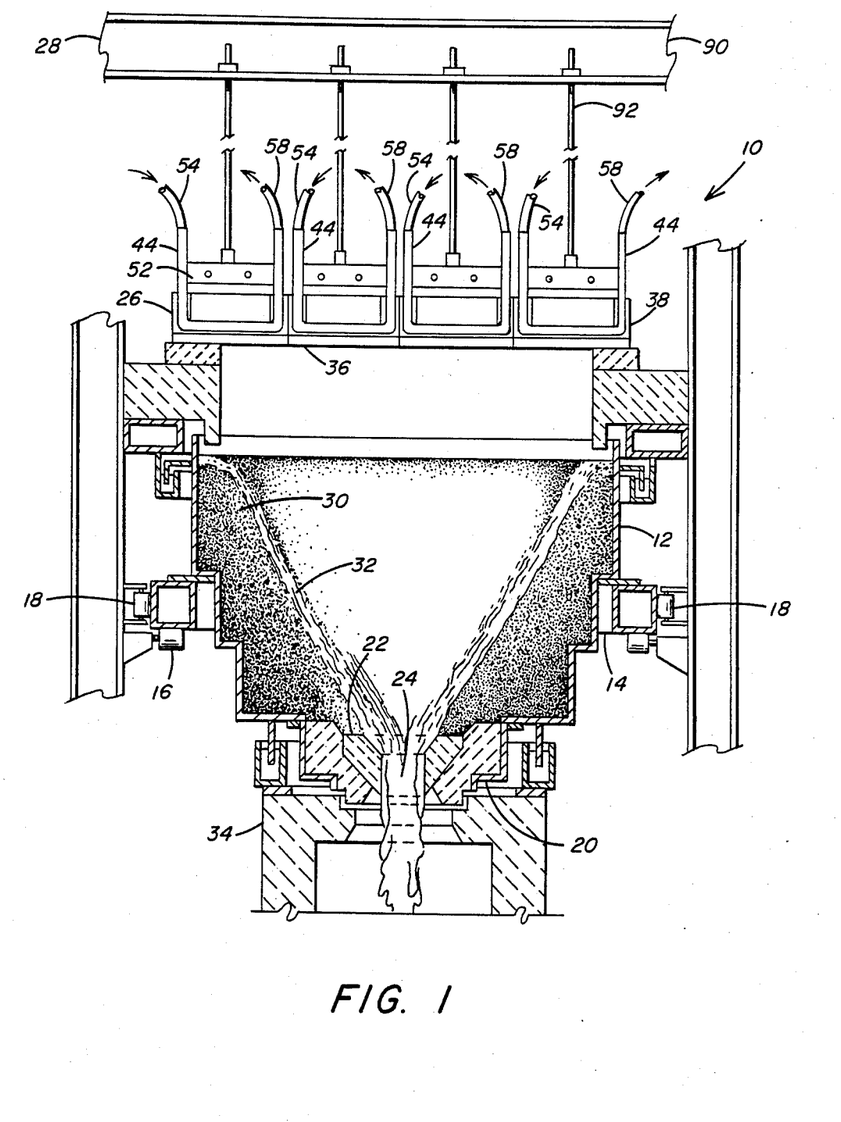
FIG. 1 is a cross-section of a heating vessel with a lid having features of the present invention.

In a melting process, material is deposited in a vessel which, in the preferred embodiment, is adapted to apply intense heat to the material in a relatively small space to rapidly convert the material to a liquefied state which thereafter flows out of the vessel. FIG. 1 illustrates a liquefaction vessel 10 of the type disclosed in U.S. Pat. No. 4,496,397 to Heithoff et al., which teachings are hereby incorporated by reference. A steel drum 12 is supported on a circular frame 14 which is mounted on a plurality of support rollers 16 and aligning rollers 18 for rotation about a generally vertical axis corresponding to the center line of the drum 12. An outlet assembly 20 below the drum 12 includes a bushing 22 with an open center 24. Lid 26, which is the subject of this invention, is provided with a stationary support by way of an overhead frame 28. The lid 26 includes one or more openings 29 (see FIG. 3) for inserting a high temperature burner (not shown).

Within the liquefaction vessel 10 a stable layer of unmelted batch 30 is maintained on the walls of the drum 12 encircling the central cavity within which combustion and melting take place. The heat from the flame of the burners (not shown) causes a surface portion 32 of the batch to become liquefied and flow downwardly through the bottom opening 24. The liquefied batch then flows out of the liquefaction vessel 10 and may be collected in a vessel 34 below the liquefaction vessel 10 for further processing as needed for example, as taught in U.S. Pat. No. 4,381,934. Exhaust gases escape either upwardly through an opening in the lid 26 and into an exhaust outlet (not shown) or downwardly through the bottom opening 24 at the bushing 22.

During the melting process in the liquefaction vessel 10 various materials become entrained in the hot exhaust gas stream. For example in a typical soda-lime-silica glass batch these entrained materials may include vapors such as, but not limited to, sodium oxide and particulates such as, but not limited to, sodium sulfate or sodium carbonate, all of which are highly corrosive. The vapors and particulates combine with the hot exhaust gas to form a corrosive and abrasive gas stream that may leave deposits that corrode the inner surface 36 of the lid 26 that is exposed to the gas. The high temperature within the liquefaction vessel 10 helps accelerate this corrosion and wear. In addition, the particulate entrained in the gas stream may further erode the surface 36.

Figure 2:
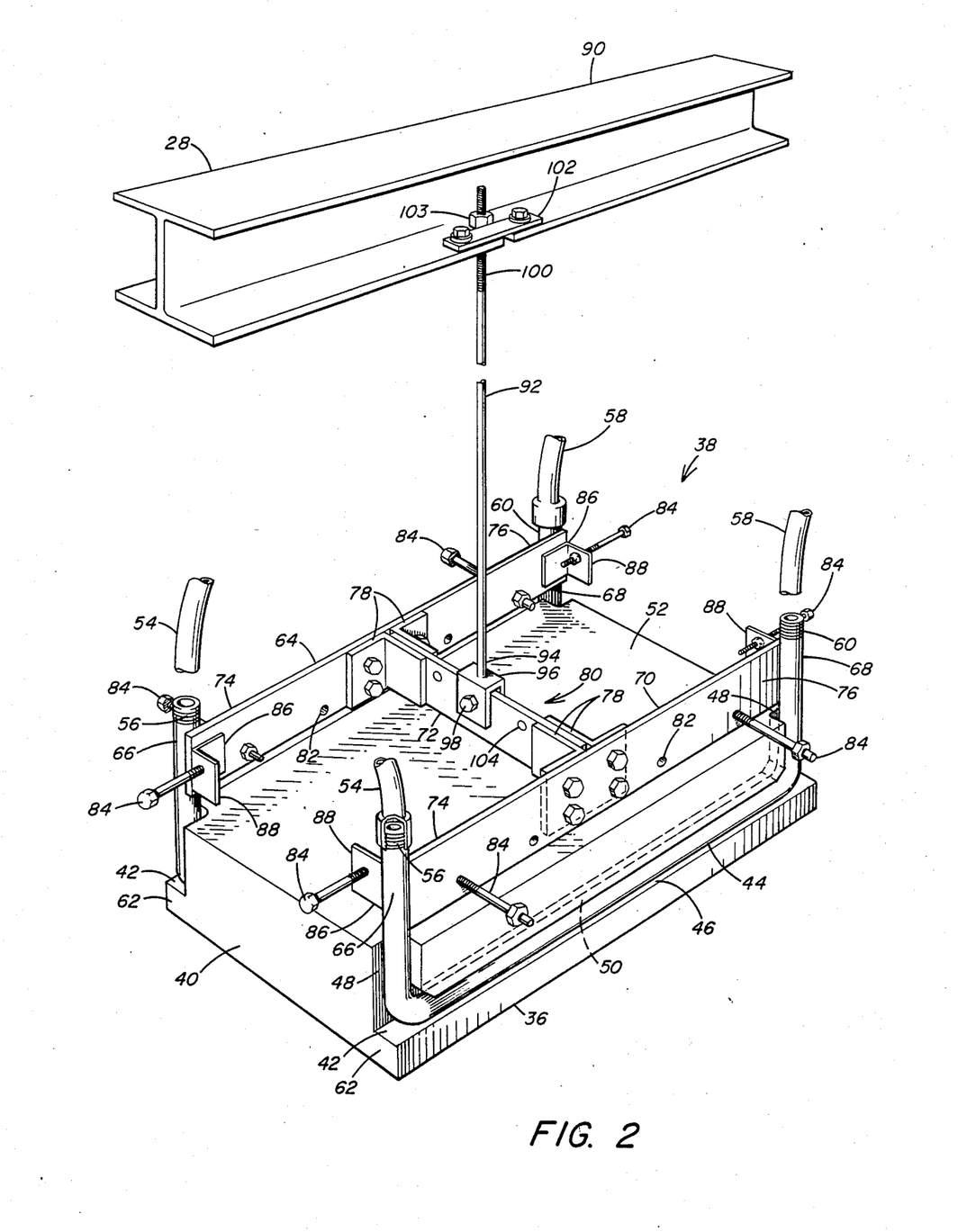
FIG. 2 is an isometric view of a preferred embodiment of a refractory block lid module of the present invention.

Referring to FIG. 2, the lid 26 of the present invention provides a modular lid construction such that individual lid modules 38 can be removed without interrupting the heating process in the liquefaction vessel 10 and replacing the entire lid 26. The lid 26 includes individually replaceable lid modules 38 which are suspended below frame 28. Each lid module 38 includes a block 40 which is a high heat resistant refractory material such as, but not limiting to this invention, fusion cast alumina zirconia silica materials. If the environment within the vessel 10 is highly corrosive as well as high in temperature, the blocks 40 may also be corrosion resistant. For example the blocks 40 can be fabricated of a MONOFRAX® S-3 Epic-3 refractory material available from The Carborundum Co., Niagara Falls, N.Y. The blocks 40 are preferably commercially available standard shapes such as a rectangular solid. By using standard shapes, custom casting of specialized shapes is not required. In the preferred embodiment each block 40 has a groove 42 cut along opposite vertical sides to receive support pipes 44. Although not limiting to the present invention, the groove 42 is preferably U-shaped as shown in FIG. 1 and viewed from the side in FIG. 2 with a generally horizontally extending center portion 46 and generally vertically extending end portions 48 at the corners of the block 40. Center portion 46 includes an upper ledge portion 50 which rests on pipe 44 which in turn supports the block 40. Each pipe 44 must have sufficient wall thickness such that the pair of pipes can fully support the weight of the block 40. The groove 42 is preferably deep enough into the vertical sides of block 40 such that pipe 44 fit completely within the grooves. The pipes 44 may be a single or multiple part pipe shaped to fit the groove 42 and are preferably made of stainless steel. Center portions 46 of grooves 42 are preferably positioned in the lower portion of the block 40 so that the pipes 44 support a majority of the weight of the block 40 above it rather than hanging a majority of the weight of the block 40 below it so as to reduce the amount of refractory material spalling off from the block 40 and falling into the heating vessel 10 due to its own dead weight. Although pipes 44 and corresponding grooves 42 are preferably U-shaped, in practice they can be any shape that provides support to the refractory block 40 from the pipes 44. For example, the sides of the block 40 may include a "V" shaped groove to receive support pipes 44.

Insulating board (not shown) may be positioned on the upper surface 52 of the blocks 40 if additional protection against heat from the vessel 10 is required.

Because the pipes 44 are close to the inner surface 36 of the lid 26, they are subjected to high temperatures. To maintain their structural integrity, the pipes 44 are cooled by passing coolant therethrough. Referring to FIGS. 1 and 2, each pipe 44 includes a coolant inlet conduit 54 connected to pipe inlet 56 and coolant outlet conduit 58, connected to pipe outlet 60, each conveniently connected to a coolant supply system (not shown). The inlet corduit 54 of one pipe 44 may be connected to the outlet conduit 58 of a second pipe 44 to circulate the coolant directly from one module 38 through another. To maximize the independent modularity of the lid 26 so that the individual lid modules 38 can be removed and replaced with minimal effect on the remaining portion of the lid 26, each coolant inlet conduit 54 and outlet conduit 58 may be individually connected to the common coolant supply system (not shown). As a result, the cooling system for any one module 38 can be independently connected and disconnected from the coolant supply system so that each module 38 is an independent insulating unit with cooled support pipes. The opening through each pipe 44 should be sufficient to allow sufficient coolant to pass therethrough so as to cool the pipe 44 and maintain its structural integrity. Shoulder 62 of the block 40 also provides insulating protection to the pipe 44 as shown in FIG. 2. If required, the pipes 44 can be wrapped with additional insulation to protect it against excessive heat. If the lid 26 is used on a vessel wherein the heat within the vessel is not excessive, shoulders 62 may be eliminated. It is noted that the preferred embodiment of the invention uses water cooled pipes to support the blocks within the lid 26.

If the lid 26 is not exposed to sufficiently high temperature that would adversely affect the structural integrity of the pipes 44 or if the pipes 44 are sufficiently insulated to protect against excessive heat, the pipes 44 need not be cooled. As an alternative under these conditions, the pipes 44 can be replaced by solid rod members to lift the individual lid modules 38.

The lid module 38 further includes a block support structure 64 to support the module 38 from the support frame 28. For example, the support structure 64 may be connected to the vertically extending portions 66 and 68 of the pipe 44 and include a pair of longitudinally extending bar members 70 interconnected by a cross member 72. Opposing ends 74 and 76 of each bar member 70 may be connected to the vertically extending portions 66 and 68, respectively, by any convenient means, such as welding. Angle members 78 mounted at the ends of cross member 72 may interconnect the bar members 70 to form an H-shaped harness 80 spaced above the upper surface 52 of the blocks 40. Each bar member 70 may include a set of holes 82 to be used for insertion of connectors 84 therethrough as will be discussed later. The ends of each bar 70 may also include angles 86 having an apertured leg portion 88 to receive connectors 84 as will be discussed later. As a result the harness 80 functions to hold the pipes 44 in their respective grooves 42, interconnect the pair of pipes 44 of the module 38, and provide an arrangement for interconnecting adjacent blocks. In addition, the cross member 72 of the harness 80 provides connection for supporting and replacing the module 38 as will be discussed later.

Referring to FIG. 2, the block support structure 64 with the block 40 supported thereon is hung from beam 90 of support frame 28, for example, by tie rods 92. Lower end 94 of at least one tie rod 92 may be fixed to clevis 96 which may straddle cross member 72 and may be attached thereto, e.g., by nut and bolt assembly 98. Upper end 100 of rod 92 may be attached to support beam 90 of the frame 28 in any convenient manner. For example, threaded upper end 100 can be bolted to a flange portion of the beam 90 and held in place by keeper assembly 102. The relative distance between the blocks 40 and the beam 90 can be adjusted based on the depth of the threaded engagement of end 100 by bolt 103 at the beam 90.

It should be appreciated that other support structures 64 may be employed to support the modules 38. For example, portions 66 and 68 of pipes 44 may be interconnected by an X-shaped structure wherein portion 66 of one pipe 44 is interconnected to portion 68 of the other pipe 44. In addition, multiple tie rods 92 may be used to support the modules 38.

Figure 3:
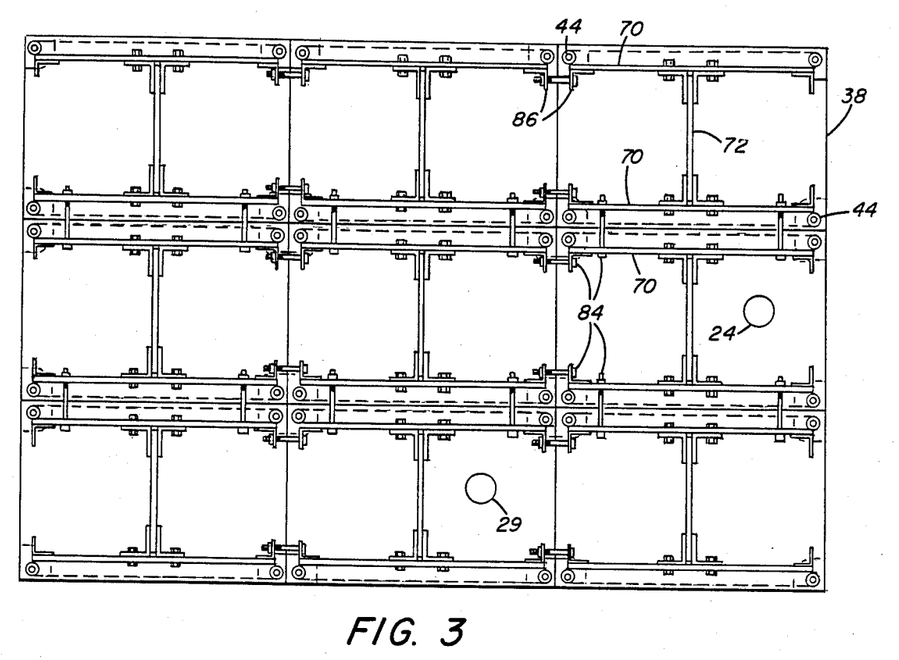
FIG. 3 is a top view of a portion of a lid having interconnected lid modules of the present invention, with portions removed for clarity.

FIG. 3 illustrates the top view of a portion of a lid constructed according to the present invention. The modules 38 may be interconnected in any convenient fashion. For example, the modules 38 may be arranged so that the holes 82 in the bar member 70 of adjacent blocks 40 are aligned and apertured legs 88 in the angle members 86 of adjacent blocks are aligned. The connectors 84, for example bolts, are inserted through holes 82 of the adjacent bars 70 and through apertured legs 88 of the adjacent angles 86 to interconnect the entire lid structure. By tightening the connectors 84 the entire assembly is "pulled together" into a tight lid structure that is suspended below the frame 28 by the tie rods 92. A layer of insulating paper (not shown) may be provided between adjacent blocks. It should be appreciated that the modules 38 forming the lid 26 or portions thereof may be interconnected by other arrangements such as clamps or bands surrounding the modules 38 to be interconnected.

The modules 38 may be removed in any convenient fashion. For example, referring to FIGS. 2 and 3, to replace a module 38 positioned within the lid 26, an overhead hoist (not shown) may be used. The hoist may lower an assembly (not shown) to connect to holes 104 on the cross member 72 of the harness 80. The hoist cable may then be tensioned so as to support the module 38 as the tie rod 92 and connectors 84 are disconnected and the inlet conduit 54 and outlet conduit 58 are uncoupled from pipes 44. The hoist thereafter may lift the lid module 38 out from the lid 26, transfer it to an unloading site and return to the opening in the lid 26 with a new lid module 38 which includes a new block 40, support pipes 48 and harness 80. As an alternative, the modules 38 may be lifted directly by the rods 92.

Figure 4:
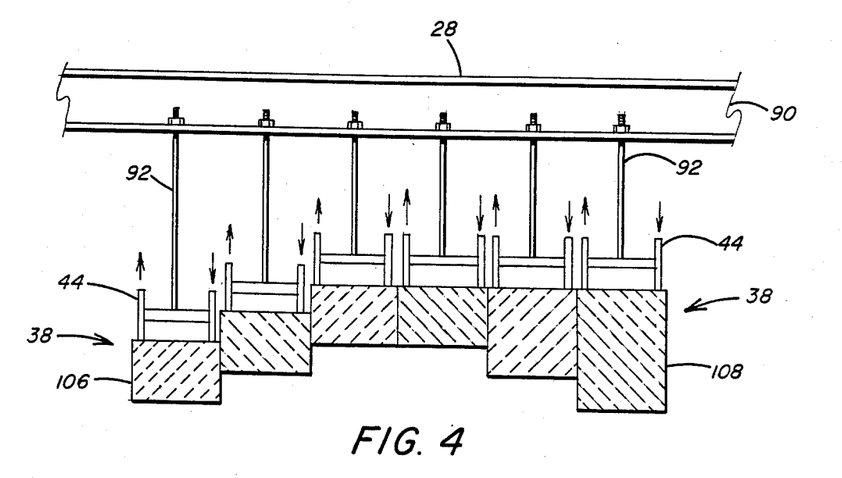
FIGS. 4 and 5 are cross-sections of further embodiments of the lid of the instant invention.
Figure 5:
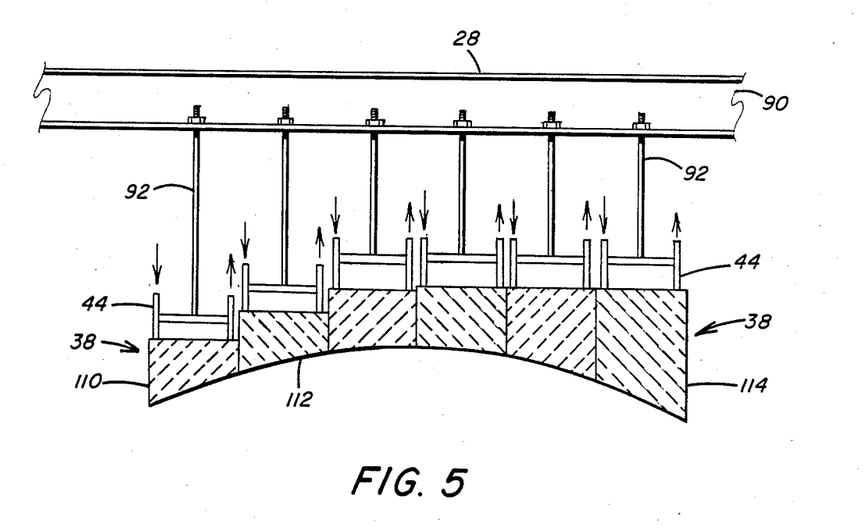

FIGS. 4 and 5 illustrate additional embodiments of the modular lid design of the present invention. FIG. 4 shows a stepped domed lid construction. On the left side of FIG. 4 blocks 106 having a constant thickness are used. The tie rods 92 are adjusted to position the modules 38 further or closer from the frame 28. On the right side of FIG. 4 the thickness of blocks 108 of each module 38 are varied to affect the same configuration, as shown on the left side. FIG. 5 illustrates a smoothly surfaced, domed lid construction. On the left side of FIG. 5, blocks 110 are of the same thickness and stepped but their downwardly facing surfaces 112 are contoured to form a continuous domed surface. On the right side of FIG. 5 blocks 114 of varying thicknesses are used to form the domed surface 112. It should be appreciated that even though each of FIGS. 4 and 5 illustrate a left side lid configuration that is different from the right side, the entire lid structure could be entirely one configuration i.e. either the left or right side.

Figure 6:
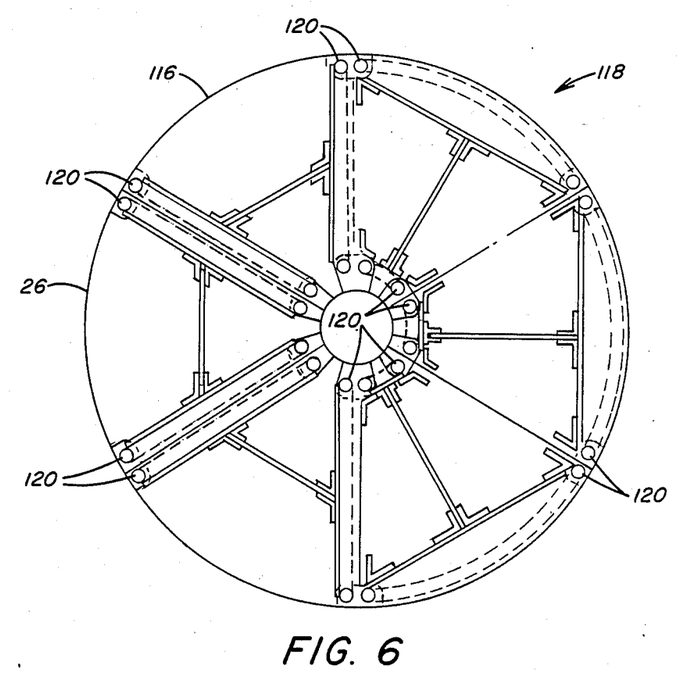
FIG. 6 is a top view of an additional embodiment of the lid.

It should be appreciated that although the prefered embodiment uses commercially available standard shapes for the blocks 40, the blocks can be any required shape. Referring to FIG. 6 for example, blocks 116 of the lid module 118 for lid 26 are wedge shaped with the support pipes 120 positioned either along the opposing nonparallel walls as shown in the left side of FIG. 6 or, along the parallel, curved walls, as shown on the right side. As with FIGS. 4 and 5, the entire lid structure shown in FIG. 6 could be entirely one configuration, i.e., either the left or right side.

The lid design of the present invention may be combined with other lid or roof configurations wherein only selected portions of the roof require continual monitoring and replacement due to temperature and/or corrosive and/or erosive conditions within the heating vessel. For example, a roof may be a continuous one piece structure over a majority of the vessel with replaceable modules 38 at potential problem areas, such as in the vicinity of a material loading chute or an exhaust outlet.

It should be appreciated that the lid design of the present invention may be modified to form a modular type lid construction wherein not all of the insulating modules are directly supported by the cooled support structure. For example, supported modules may be spaced apart and provided with a tab or ledge portion to support an intermediate insulating block positioned therebetween. The intermediate block may be removed without affecting the supporting modules 38 while the replacement of the module 38 would additionally require the removal of any intermediate insulating blocks supported thereon.

The forms of the invention described herein represent the preferred embodiments and various modifications thereof. It is understood that various changes may be made without departing from the spirit of the invention defined by the claims that follow.

We claim:

1. A lid for heating vessel comprising;
a plurality of discrete heat insulating members including selected insulating members having grooved portions in opposing side walls;
means to support said insulating members relative to an open and of said vessel; and
means to independently support at least one of said selected members for vertical movement relative to the other insulating members, including at least two support pipes each having a portion positioned within said grooved portions of said selected members.

2. The lid as in claim 1 further including means to cool said support pipes.

3. The lid as in claim 2 wherein said cooling means includes means to direct coolant through said pipes.

4. The lid as in claim 3 wherein said groove extends downward from the upper surface of said insulating member, along said side walls and upward to said upper surface.

5. The lid as in claim 4 wherein said groove includes a generally horizontally extending center portion and opposing generally vertically extending end portions wherein said end portions extend to said upper surface of said unit and a ledge of said center portion rests on said support pipes.

6. The lid as in claim 5 wherein said pipes extend the length of said groove and further including generally vertically extending pipe portions extending from said pipes above said insulating member to provide an inlet and an outlet end of said pipes and further including means to interconnect said vertically extending pipe portions of said support pipes of the same block.

7. The lid as in claim 6 wherein said support means further includes at least one rod extending from said pipe portion interconnecting means to an overhead lid support frame.

8. The lid as in claim 7 wherein said pipe portion interconnecting means includes a first bar member with end portions connected to said inlet end pipe portion and outlet pipe portion of one of said pipes, a second bar member with end portions connected to said inlet end pipe portion and outlet end pipe portion of the other of said pipes and a cross member to connect said bar members.

9. The lid as in claim 8 further including means to interconnect said insulating members.

10. The lid as in claim 9 wherein said member interconnecting means includes fasteners to connect said insulative bar members with bar members of adjacent insulating members.

11. The lid as in claim 10 wherein said insulating member is a rectangular solid and a refractory block.

12. The lid as in claim 11 wherein said heating vessel is a glass melting furnace.

13. The lid as in claim 1 further including means to interconnect said insulating block members.

14. The lid as in claim 13 wherein said groove extends downward from the upper surface of said insulating member, along said side walls and upward to said upper surface.

15. The lid as in claim 14 wherein said groove includes a generally horizontally extending center portion and opposing generally vertically extending end portions wherein said end portions extend to said upper surface of said unit and a ledge of said center portion rests on said support pipes.

16. The lid as in claim 15 wherein said pipes extend the length of said groove and further including generally vertically extending pipe portions extending from said pipes above said insulating members provide an inlet and an outlet end of said pipes and further including means to interconnect said vertically extending pipe portions of said support pipes of the same insulating member.

17. The lid as in claim 16 wherein said support means further includes at least one rod extending from said pipe portion interconnecting means to an overhead lid support frame.

18. The lid as in claim 17 wherein said pipe portion interconnecting means includes a first bar member with end portions connected to said inlet end pipe portion and outlet pipe portion of one of said pipes, a second bar member with end portions connected to said inlet end pipe portion and outlet end pipe portion of the other of said pipes and a cross member to connect said bar members.

19. The lid as in claim 18 wherein said insulating member interconnecting means includes fasteners to connect said bar members with bar members of adjacent insulating members.

20. The lid as in claim 19 further including pipes to cool said support means.

21. The lid as in claim 20 wherein said cooling means includes means to direct coolant through said pipes.

22. The lid as in claim 21 wherein said heating vessel is a glass melting furnace.

23. A lid for a material melting apparatus including a heating vessel and means for heating said material within said vessel wherein portions of said material vaporizes and produces corrosive gases which degrade portions of said lid as said gas circulates within said vessel so as to require replacement of said degraded portions, the lid comprising:
a plurality of heat insulating modules each including a refractory block;
means to support the block of selected ones of said modules such that each of said selected module blocks includes at least two support pipes having portions positioned within grooves along opposing side walls of said selected module block in a manner so as to support said selected module block independently from the others of said module blocks; and
means to independently support said selected modules in spaced relation above said vessel in a manner such that said selected modules are vertically movable relative to the other modules so as to allowed removal and replacement of said modules.

24. The lid as in claim 23 further including means to cool said support pipes.

25. The lid as in claim 24 further including means to interconnect each of said modules with selected adjacent modules.

26. The lid as is claim 25 wherein said cooling means includes means to circulate coolant through said pipes and said module support means include means to interconnect said ends of said pipes and at least one rod extending from said interconnecting means to an overhead lid support frame.

* * * * *

UNITED STATES PATENT AND TRADEMARK OFFICE
CERTIFICATE OF CORRECTION

PATENT NO. : 4,704,155

DATED : November 3, 1987

INVENTOR(S) : Joseph M. Matesa, Bert K. Krushinski, Arthur C. Knickerbocker

It is certified that error appears in the above-identified patent and that said Letters Patent is hereby corrected as shown below:

Claim 10 (Column 8, line 67) after "said" insert --insulating--.

Claim 10 (Column 9, Line 1) "insulative" should be deleted.

Claim 16 (Column 9, Line 23) "members" should be "member to".

Signed and Sealed this

Twenty-eighth Day of November 1989

Attest:

JEFFREY M. SAMUELS

Attesting Officer     Acting Commissioner of Patents and Trademarks